United States Patent [19]

Statton

[11] 4,202,950

[45] May 13, 1980

[54] PROCESS FOR PREPARING POLYURETHANE ELASTOMERS

[75] Inventor: Gary L. Statton, Wallingford, Pa.

[73] Assignee: Atlantic Richfield Company, Los Angeles, Calif.

[21] Appl. No.: 833,950

[22] Filed: Sep. 16, 1977

Related U.S. Application Data

[63] Continuation-in-part of Ser. No. 646,119, Jan. 2, 1976, abandoned.

[51] Int. Cl.² ............................................. C08L 75/00
[52] U.S. Cl. .................................... 525/123; 525/126; 525/453; 525/911
[58] Field of Search ................................... 260/859 R

[56] References Cited

U.S. PATENT DOCUMENTS

| | | | |
|---|---|---|---|
| 3,427,366 | 2/1969 | Verdol | 260/859 R |
| 3,431,235 | 3/1969 | Lubowitz | 260/47 |
| 3,515,772 | 6/1970 | Lubowitz | 260/836 |
| 3,616,193 | 10/1971 | Lubowitz | 260/859 R |
| 3,635,891 | 1/1972 | Lubowitz | 260/859 R |
| 3,671,301 | 6/1972 | Dahl | 117/122 P |
| 3,674,743 | 7/1972 | Verdol | 260/73 L |
| 3,855,379 | 12/1974 | Araki | 260/859 R |
| 3,860,672 | 1/1975 | Lagally | 260/859 R |
| 3,879,248 | 4/1975 | Kest | 260/859 R |
| 3,891,523 | 6/1975 | Hisamatsu | 260/859 R |
| 3,954,686 | 5/1976 | Lagally | 260/2.5 AK |
| 4,020,125 | 4/1977 | Suzuki | 260/859 R |
| 4,041,104 | 8/1977 | Selley | 260/859 R |

OTHER PUBLICATIONS

Tikhomirov, B. J. et al., Chemical Abstracts, vol. 77, Jul. 24, 1972, Abstract No. 20,262e.

Primary Examiner—Paul Lieberman
Attorney, Agent, or Firm—Coleman R. Reap

[57] ABSTRACT

Polyurethane compositions having improved tensile strength and tear strength are prepared by graft polymerizing an ethylenically unsaturated monomer onto a liquid, hydroxyl-containing diene polymer and reacting the resulting graft copolymer with a polyfunctional organic isocyanate. Conventional catalysts and polymerization procedures are employed.

9 Claims, No Drawings

PROCESS FOR PREPARING POLYURETHANE ELASTOMERS

BACKGROUND OF THE INVENTION

FIELD OF THE INVENTION—RELATED APPLICATION

This application is a continuation-in-part of application Ser. No. 646,119, filed Jan. 2, 1976. This invention relates to polyurethanes and more particularly to improved polyurethane compositions prepared from liquid hydroxyl-containing diene polymers.

PRIOR ART

U.S. Pat. No. 2,859,201 discloses the graft polymerization of vinyl monomers onto polymerized dienes. U.S. Pat. No. 3,294,711 discloses the preparation of polyurethanes by reacting polyisocyanates with graft copolymers prepared by graftpolymerizing vinyl monomers onto a polyester polyol backbone polymer. U.S. Pat. No. 3,304,273 discloses the introduction of isocyanate reactive groups into vinyl polymer by polymerizing vinyl monomers in the presence of compounds which are reactive with the vinyl monomers and which contain isocyanatereactive groups. The resulting polymers are reacted with isocyanates to produce polyurethanes. The preparation of polyurethane elastomers from hydroxyl-containing diene polymers and polyisocyanates is disclosed in U.S. Pat. No. 3,674,743. U.S. Pat. No. 3,779,977 discloses the graft polymerization of vinyl monomers onto hydroxyl-terminated diene polymers.

SUMMARY OF THE INVENTION

It is an object of the invention to present a method of preparing polyurethane elastomers having improved tensile strength and tear strength. It is another object of the invention to present a method of improving the tensile strength and tear strength of polyurethanes prepared from hydroxyl-terminated diene polymers. It is another object of the invention to present polyurethane elastomers having improved tensile strength and tear strength. It is another object of the invention to present novel polyurethanes which are prepared by reacting polyisocyanates with hydroxyl-terminated diene polymers having grafted thereon vinyl monomers. These and other objects of the invention will become apparent from the following description and examples.

In accordance with the invention the above objectives are achieved by graft polymerizing a vinyl monomer onto a hydroxyl-containing diene polymer and reacting the resulting graft copolymer with a polyisocyanate to produce solid elastomeric polyurethanes. Preferred vinyl monomers are styrene, acrylic monomers and vinyl esters. The preferred hydroxyl-containing diene polymers are polybutadiene homopolymers and butadiene-styrene copolymers. The preferred polyisocyanates are the aromatic diisocyanates. The grafting reaction is preferably carried out with the aid of a free radical catalyst and the urethane reaction is preferably carried out with the aid of a urethane condensation catalyst. Additional polyols such as diols may be added to the hydroxyl-containing graft copolymer-polyisocyanate reaction mixture.

DESCRIPTION OF THE INVENTION

The vinyl monomers useful in preparing the hydroxyl-containing liquid graft copolymers are any of the vinyl monomers which are copolymerizable with the diene polymers described below. These include vinyl aromatic compounds such as styrene, vinyl benzene, vinyl toluene, etc.; esters of acrylic or methacrylic acid in which the alcohol portion of the ester contains 1 to 18 carbon atoms, such as ethyl acrylate, butyl acrylate, ethyl hexyl acrylate, methyl methacrylate, butyl methacrylate, hydroxyl ethyl methacrylate, lauryl methacrylate, etc.; nitriles of polymerizable acids such as acrylonitrile, methacrylonitrile, etc.; vinyl esters of saturated acids, such as vinyl acetate, vinyl proprionate, etc.; halogenated ethylenically unsaturated monomers such as vinyl chloride, vinyl bromide, vinylidine chloride, etc.

The hydroxyl-containing diene polymer may be any normally liquid diene homopolymer or diene-vinyl monomer copolymer. Dienes which are employed to make the hydroxylated diene polymers are unsubstituted, 2-substituted or 2,3-disubstituted 1,3-dienes of up to about 12 carbon atoms. The diene preferably has up to about 6 carbon atoms and the substituents in the 2- and/or 3-position may be hydrogen, alkyl, generally lower alkyl, e.g., of 1 to 4 carbon atoms, aryl (substituted or unsubstituted), halogen, nitro, nitrile, etc. Typical dienes which may be employed are 1,3-butadiene; isoprene; chloroprene; 2-cyano-1,3-butadiene; 2,3-dimethyl-1,3-butadiene; etc. The choice of diene will usually depend upon the properties desired in the finished product, e.g., chloroprene may be used, alone or in a mixture with other dienes to produce oil-resistant and flame-proof rubbers.

Vinyl monomers usable in the preparation of hydroxyl-containing copolymers include any alpha-monoolefinic materials copolymerizable with diene monomers an having 2 to about 12 carbon atoms, such as styrene, vinyl toluene, ethyl acrylate, methyl methacrylate, acrylic acid, acrylonitrile, vinylidene cyanide, acrylamide, vinyl chloride, vinylidene chloride, etc. Such monomers provide low-molecular weight hydroxy-terminated diene intermediate copolymers which have sites suitable for cross-linking. The choice and amount of monoolefinic monomer employed will often be determined on the basis of properties desired in the final elastomer resin. For example, solvent-resistant rubbers may be formulated by copolymerization of butadiene with acrylonitrile, or other monoolefin, substituted with a non-hydrocarbon radical, to produce the intermediate polymer. Generally the amount of monoolefinic monomer in the polymer will be 0 to about 75% by weight of the total addition polymer, preferably about 1 to 40% or even about 10 to 40%, and the balance can be essentially the 1,3 diene.

The hydroxyl-containing liquid diene polymer often has a molecular weight of up to about 50,000 but is usually in the range of about 500 to 20,000, and preferably in the range of about 900 to 10,000 as determined by cryoscopic, ebullioscopic or osmotic methods.

The polyhydroxyl diene polymers preferred for use in the preparation of the graft copolymers of the invention have at least 1.8 predominantly primary, allylic, terminal hydroxyl groups per polymer molecule. The diene polymer generally has about 1.8 to 3, and preferably 2.0 to 2.4 hydroxyl groups per molecule. The hydroxyl-terminated diene polymers which produce compositions having the greatest utility are those having primary hydroxyl groups in terminal allylic positions on the main, generally longest, hydrocarbon chain of the molecule. By "allylic" configuration is meant the alpha-allylic grouping of allylic alcohol, that is, terminal hydroxyls of the intermediate diene polymer attached to a carbon adjacent to a double bond carbon. By terminal hydroxyl is meant that the hydroxyl is attached to a terminal carbon atom, that is, the carbon atoms at the end of the polymer chain.

The number and location of the hydroxyl groups and the molecular weight of the hydroxylated diene polymer are, for the most part, a function of polymerization temperature and the type of addition polymerization system employed in forming the polymer.

The hydroxyl-terminated diene homopolymers and copolymers useful in this invention may be prepared by any of the well known procedures, and their method of preparation forms no part of this invention.

Suitable diene polymers may be obtained using hydrogen peroxide as the catalyst for polymerization. The free-radical addition polymerization usually takes place at a temperature of about 100° to 200° C., preferably about 100° to 150° C. The preparation of typical hydroxylated diene polymers and copolymers is described in detail in U.S. Pat. Nos. 3,427,366, 3,673,168 and 3,674,743, the disclosures of which are incorporated herein by reference.

The grafting of the vinyl monomer onto the hydroxyl-containing diene polymer may be accomplished by any of the usual polymerization procedures including polymerization in aqueous systems, i.e., emulsion or suspension polymerization, mass or bulk polymerization, or solution polymerization. In general, it is preferred to carry out the grafting reaction by mass polymerization techniques when the hydroxyl-containing diene polymer is miscible with or soluble in the vinyl monomer. If necessary or desirable an organic liquid diluent can be added to the reaction mixture. Diluents in which the hydroxyl-containing diene polymer reactant and the graft copolymer product are soluble are preferred. Suitable diluents are those which are non-reactive under the polymerization reaction conditions including organic liquids such as benzene, ethylbenzene, toluene, the xylenes, methyl ethyl ketone, acetone, cellosolve acetate, methylene chloride, dimethylformamide, etc.

Although the grafting reaction may be carried out by thermal polymerization, usually at temperatures of about 60° C. to 170° C., it is generally preferred to carry out this reaction with the aid of a catalyst. Suitable catalysts include free radical generating catalysts such as the conventional peroxy or perazo catalysts. Exemplary catalysts are di-tert-butyl peroxide, benzoyl peroxide, lauroyl peroxide, oleyl peroxide, toluyl peroxide, di-tert-butyl diperphthalate, tert-butyl peracetate, tert-butyl perbenzoate, dicumyl peroxide, tert-butyl peroxide, isopropyl carbonate, 2,5-dimethyl-2,5-di(tert-butyl-peroxy)-hexane, 2,5-dimethyl-2,5-di(tert-butylperoxy)-hexyne-3, tert-butyl hydroperoxide, cumene hydroperoxide, hydroperoxide, cyclopentane hydroperoxide, diisopropylbenzene hydroperoxide, p-tert-butyl cumene hydroperoxide, 2,5-dimethylhexane-2,5-dihydroperoxide, 2,2'-azobisisobutyronitrile, etc., and mixtures thereof. If the polymerization is carried out in aqueous emulsion it is preferable to use water soluble catalysts such as oxidation-reduction systems for example, ammonium persulfate and sodium bisulfate, etc. The catalyst, when included, is generally in the range of 0.001 to 5.0 percent and preferably on the order of 0.05 to 2.5 percent by weight of the polymerizable material, depending upon the monomer being grafted into the hydroxyl-containing diene polymer.

It is usually desirable to degas the reaction mixture for a sufficient period of time to remove oxygen from the reaction zone since oxygen inhibits the polymerization reaction. The degassing can be conveniently accomplished by blowing nitrogen gas through the reactor prior to the polymerization. It is also usually desirable to conduct the polymerization under a continuous nitrogen blanket.

The organic polyisocyanates which are reacted with the hydroxyl-containing graft copolymer may be any of the polyisocyanates conventionally used to prepare polyurethanes. Polyisocyanates used to prepare polyurethanes include saturated and unsaturated aliphatic and cycloaliphatic compounds, aromatic compounds, aliphatic-substituted aromatic compounds, and aryl-substituted aliphatic compounds, etc. The polyisocyanates used in the invention generally have a functionality of at least 2 and generally of about 2 to 6 isocyanate groups per molecule. It is preferred to use diisocyanates, i.e., those which have 2 functional groups per molecule as these are more economical to produce than organic isocyanates having more than two isocyanate groups per molecule. Aromatic polyisocyanates are preferred over aliphatic isocyanates as they are considerably less toxic and, therefore, present fewer handling problems and, furthermore, they are generally more reactive than the aliphatic isocyanates. The polyisocyanates used in the invention may contain substituents provided they do not interfere with the desired reaction between the polyisocyanates and the polyols.

Included among the aliphatic isocyanates usable in the invention are alkylene diisocyanates such as 1,3-trimethylene, diisocyanate; 1,4-tetramethylene diisocyanate; 1,6-hexamethylene diisocyanate; 1,3,5-pentamethylene triisocyanate; 1,4-cyclohexane diisocyanate; 1,4-cyclohexylene diisocyanate; 1,4-diisocyanato butene-2. Examples of aromatic isocyanates are tolylene diisocyanate; p-phenylene diisocyanate; diphenyl methane diisocyanate; dimethyl diphenyl methane diisocyanate; bibenzyl diisocyanate; bitolyl diisocyanate; benzene triisocyanate; 1,5-tetrahydronaphthalene diisocyanate; 4-chloro-1,3-phenylene diisocyanate; etc. In the case of aromatic isocyanates, the isocyanate groups may be attached to the same or different rings.

It is often desirable to modify the physical properties of the final product by incorporating one or more other polyols and/or other active hydrogen-containing compounds into the graft copolymer-polyisocyanate reaction mixture. Preferred active hydrogen-containing compounds include aliphatic and aromatic polyols and polyamines and polymers such as polyester polyols or polyamines polyether polyols or polyamines and polylactones and similar compounds having two or more —OH, —NH— or $NH_2$ groups or mixtures of these per molecule and having 2 to about 100,000 carbon atoms with hydroxyl numbers ranging from 12 to 1,100 or more. Mixtures of two or more of these compounds can also be employed. In preparing high molecular weight elastomeric products it is preferable that the reactive hydrogen content of the polyol or polyamine be in the range of about 2 to 3 groups per molecule. When more highly cross-linked polymeric products are to be prepared, the functionality of these compounds may be somewhat higher than 2 and generally up to about 6 or more groups per molecule. It is preferred that the concentration of materials having functionality greater than 6 be kept low to prevent premature setting of the polyurethane composition.

The lower molecular weight aliphatic and aromatic polyols and polyamines include diols, triols, tetraols, etc., for example, ethylene glycol; diethylene glycol; propylene glycol; 1,3-butylene glycol; 1,6-hexanediol; 2-ethylhexane-1,3-diol; triethylene glycol; butenediol; amylene glycols; 2-methyl-pentanediol-2,4; 1,7-heptanediol; glycerine; neopentyl glycol; glycerine, trimethylol propane, pentaerythritol; cyclohexane dimethanol; sorbitol; mannitol; glactitol; talitol; xylitol; 1,2,5,6-tetrahydroxyhexane; styrene glycol; N,N-bis(-hydroxypropyl)phenylamine; bis(hydroxyethyl)dimethythydantoin; bis($\beta$-hydroxyethyl)diphenyl-dimethylmethane; 1,4-dihydroxybenzene, etc., and the corresponding amine-containing compounds and other polyamines such as 3,3-dichlorobenzidene; 4,4'-methylene bis(2-chloroaniline); N,N'-bis(1,4-dimethylpentyl)-paraphenylenediamine; etc.

Higher molecular weight polyhydroxyl- or amine-containing compounds useful for modifying the properties of the final product include, for instance, polymers such as polyhydric polyalkylene ethers, polyhydroxyl polyesters, and hydroxyl group-containing, preferably hydroxyl-group terminated, polymers and the corresponding amine-containing polymers, The polyhydric or polyamine polyalkylene ethers may have a molecular weight greater than about 350 and a hydroxyl number of from about 10 to 600 and may be derived, for example, by the polymerization of alkylene oxides, such as ethylene oxide, propylene oxide, butylene oxide, and the like or the corresponding polyamines.

The hydroxyl- and amine-containing polyesters may be obtained by the reaction of aliphatic or aromatic dicarboxylic acids with aliphatic or aromatic polyhydric alcohols or polyamines in the manner well known to the art in proportions that result in esters or amides having at least two reactive hydroxy or amino groups. Any polyols or polyamine may be used to form the esters and amides and illustrative of such alcohols and amines are those listed above. Included within the suitable esters, aminoesters, and hydroxyl-containing thioesters are the mono and diglycerides of castor oil, tall oil, soya oil, linseed oil, etc., and the corresponding amine esters.

The preferred optional reactive hydrogen additives are the low molecular weight diols and diamines because they have the ability to impart stiffness to the product.

The above optional polyols and polyamines may be added in amounts up to about 50% and preferably up to about 20%, based on the total weight of reactive hydrogen-containing components in the reaction mixture.

The urethane reaction, i.e., the reaction between the hydroxyl-containing graft polymer and the isocyanate component may be carried out in the presence or absence of a solvent. It is usually preferred to conduct the reaction without a diluent unless the viscosity of the final product becomes so great that it becomes difficult to continue the agitation of the reacting mixture. When a diluent is employed it is preferred to use a volatile organic liquid in which the reactants and product are soluble. Typically suitable solvents are those suggested above as diluents in the graft copolymerization step. As can be appreciated when the urethane reaction is to be carried without the use of a diluent it is preferred that the graft copolymerization step be likewise carried out without using a diluent so that it will not be necessary to remove diluent from the graft copolymer product before the urethane reaction.

The urethane reaction is generally carried out at a temperature of about 20° C. to 350° C. and preferably at about 25° C. to 120° C.

Although the reaction between the hydroxyl-containing graft copolymer and the isocyanate component may be carried out without a catalyst, i.e., by thermal initiation, it is preferred to carry out the polymerization in the presence of a catalyst in order to accelerate curing. conventional catalysts for the formation of polyurethanes from isocyanates and polyols may be used including basic compounds such as tertiary amines, e.g., triethylamine, diazobicyclooctane, and triethylene diamine; and organometallic compounds such as dibutyltin dilaurate, stannous octoate, lead octoate, cobalt naphthenate, aluminum isopropoxide, etc. The catalyst is generally used at a concentration of about 0.005 to 5% and preferably about 0.01 to 2% based on the weight of total reactive components in the reaction mixture.

Before carrying out the urethane reaction it is desirable to degas the reaction vessel with a dry inert gas, such as nitrogen, to remove moisture.

The isocyanate component and reactive hydrogen-containing component should be combined in amounts which will provide an isocyanate to total reactive hydrogen ratio of approximately one. Suitable products are produced from reaction mixtures in which the isocyanate to total reactive hydrogen ratio is about 0.8:1 to about 1.5:1.

In accordance with one embodiment of the invention the urethane reaction is carried out in a "one shot" operation, that is, in one stage by combining the hydroxyl-containing graft copolymer, the polyisocyanate, catalyst, solvent, if used, and other desired additives such as additional polyols and/or polyamines, etc. and heating the reaction mixture and maintaining it at desired reaction temperatures until the reaction is completed. Upon completion of the reaction the product is removed from the reactor and it may be used as is or blended with various additives such as plasticizers, fillers, etc.

In a modification of the above procedure a prepolymer is prepared by reacting the liquid hydroxyl-containing graft copolymer with a sufficient amount of isocyanate to produce a prepolymer which is largely isocyanate terminated. The prepolymer may be prepared following the "one shot" procedure described above. The prepolymer is then combined with enough additional reactive hydrogen-containing material to produce a mixture having an isocyanate to reactive hydrogen ratio of about 0.8 to 1 to 1.5 to 1 and catalyst and heated at curing temperatures for a sufficient period to complete the urethane reaction. The reaction mixture may be cured in bulk or it may be poured into a mold having the configuration of the desired product and heated with or without pressure until the desired result is obtained.

Additives which may be incorporated into the products of the invention include fillers such as carbon, silica, silicalumina, zinc oxide, clays, talc, etc.; extending agents such as low molecular weight polymeric materials; plasticizers such as adipate or phthalate esters or esters of trimethylol, glycerine, etc.; antioxidants; coloring agents; etc. These materials may be incorporated into the compositions of the invention by addition to the reaction formulation or by inclusion into the composition during or subsequently to curing.

A principal benefit derived from the invention is that the tensile and tear strengths of polyurethane products prepared according to the process of the invention are greater than those of urethane products made from hydroxyl-containing diene polymers which have not been graft copolymerized with vinyl monomer materials. An additional benefit is that it is possible to increase the polyisocyanate content of polyurethanes without a loss in these physical properties. The reason for the improvements has not been determined with certainty however it appears that the compatibility of the various polymer components in the product is improved.

The following examples illustrate preferred embodiments of the invention. Unless otherwise indicated, parts and percentages are on a weight basis. Tensile strength measurements and elongation were determined using the procedure of ASTM D-412C and tear strength measurements were determined using the procedure of ASTM D-624C.

EXAMPLE I

Part A

A graft copolymer of methyl methacrylate and hydroxyl-containing polybutadiene is prepared by the following procedure. To a two liter glass laboratory reactor equipped with a heating jacket, an agitator, and a thermostat are added 510 grams of hydroxyl-containing polybutadiene having a number average molecular weight of 2700 and a hydroxyl content of 0.75 milliequivalents per gram (meq/gm) and 600 gms of benzene. The reactor is flushed with nitrogen gas to remove oxygen and 90 gms of methyl methacrylate and 0.90 gms of benzoyl peroxide are added to the reaction mixture. The contents of the reactor are heated to 60° C. and maintained at this temperature under a nitrogen blanket for 24 hours. The reactor contents are cooled to room temperature and the benzene and unreacted methyl methacrylate are removed under vacuum. The resulting product is a liquid graft copolymer of hydroxyl-containing butadiene and methyl methacrylate containing 10% by weight methyl methacrylate and having a hydroxyl content of 0.70 meq/gm and a Brookfield viscosity at 30° C. of 271 poise.

Part B

Three polyurethane elastomers are prepared by the following procedure. To three 2 liter glass laboratory reactors equipped with heating jackets, agitators and thermostats is added the graft copolymer product of Part A in the amounts set forth in Table I. The contents of each reactor is degassed and dried in the reactors at 125° C. for 25 minutes under vacuum. The reactor contents are cooled to room temperature and the diisocyanate is then added to each reactor in the amounts set forth in Table I. The reaction mixtures are stirred for 15 minutes at room temperature and then heated to and maintained at 40° C. for 25 minutes under vacuum with continuous stirring. The resulting products are liquid prepolymers having the free isocyanate levels shown in Table I. The liquid prepolymers are cooled to room temperature and N,N-bis(2-hydroxypropyl) phenylamine is added in the amounts shown in Table I to produce reaction mixtures having NCO/OH ratios of 1.0. To each reaction mixture is added 0.01% of debutyltin dilaurate. The reaction mixtures are stirred for five minutes, poured into 5"×10"×⅛" molds and cured for three hours at 80° C. under ten tons of pressure. The products are demolded and postcured for 48 hours at 50° C. The molded parts are tested for tensile and tear strengths and elongation and the results are reported in Table I.

TABLE I

| Component, gms | Run 1 | Run 2 | Run 3 |
|---|---|---|---|
| hydroxyl-containing graft copolymer | 100 | 85 | 50 |
| 4,4'-diphenylmethane diisocyanate | 22.5 | 36.3 | 34.6 |
| N,N-bis(2-hydroxylpropyl) phenylamine | 11.3 | 24.1 | 25.2 |
| % free NCO in prepolymer | 3.7 | 8 | 12 |
| Tensile strength, psi | 1192 | 2596 | 3738 |
| Elongation, % | 317 | 247 | 313 |
| Tear strength, pli | 185 | 379 | 642 |

EXAMPLE II

Polyurethane elastomers are prepared in accordance with the procedure of Example I, Part B, except that the hydroxyl-containing polybutadiene used as a reactant in Part A is substituted for the graft copolymer. The formulations and physical test results are reported in Table II.

TABLE II

| Component, gms | Run 1 | Run 2 | Run 3 |
|---|---|---|---|
| hydroxyl-containing polybutadiene | 100 | 85 | 85 |
| 4,4'-diphenylmethane diisocyanate | 24.4 | 38 | 60.8 |
| N,N-bis(2-hydroxypropyl) phenylamine | 12.2 | 24.5 | 43.5 |
| % free NCO in prepolymer | 4.1 | 8 | 12 |
| Tensile strength, psi | 927 | 2464 | 1906 |
| Elongation, % | 378 | 393 | 343 |
| Tear strength, pli | 166 | 340 | 315 |

A comparison of Runs 1 to 3 in Table I with Runs 1 to 3 in Table II shows that polyurethane elastomers prepared from graft copolymers of methyl methacrylate and hydroxyl-containing polybutadiene have better tensile and tear strengths than polyurethane elastomers prepared from the same unmodified hydroxyl-containing polybutadiene. Tables I and II also show that the polyurethane elastomers prepared in Example I are superior than those prepared in Example II in another respect. The tensile and tear strength properties of the Example I elastomer improve as the percentage of free isocyanate increases whereas those of the Example II elastomer fall off after the amount of free isocyanate exceeds 8%. Thus the process of the invention makes it possible to prepare considerably improved polyurethane elastomers at high polyisocyanate loadings. The following test shows the superior aging properties of the Example I polyurethane elastomer compared to the Example II polyurethane elastomer.

Samples of elastomers prepared in Run 2 of Examples I and II are exposed to ultraviolet radiation at 66° C. for 150 hours. Subsequent physical testing of the aged samples show that the polyurethane elastomer prepared from the graft copolymer (Example I) retains 85% of its tensile strength while that prepared from the unmodified hydroxyl-containing polybutadiene (Example II) retains only 65% if its tensile strength.

EXAMPLE III

A graft copolymer is prepared in accordance with the procedure of Example I, Part A, except that the reaction formulation contains 200 gms of the hydroxyl-containing polybutadiene, 40 gms of methyl methacrylate, 5.3 gms of hydroxyethyl methacrylate, 400 gms of benzene and 0.5 gm of benzoyl peroxide. The resulting liquid graft copolymer contains 15% by weight methyl methacrylate and hydroxyethyl methacrylate, has a hydroxyl content of 0.85 meq/gm and a Brookfield viscosity at 22° C. of 110 poise.

A liquid polyurethane prepolymer is prepared in accordance with the procedure of Example I, Part B, except that the reaction formulation contains 85 gms of the above graft terpolymer and 38.42 gms of 4,4'-diphenylmethane diisocyanate. The prepolymer has 8% free isocyanate. To the prepolymer are added 24.56 gms of N,N-bis(2-hydroxypropyl)phenylamine and 0.01% of dibutyltin dilaurate. The reaction mixture has an NCO/OH ratio of 1.0. Physical test specimens are prepared in accordance with the procedure of Example I, Part B. Physical Test results are reported in Table III, Run 1.

EXAMPLE IV

Physical test specimens are prepared in accordance with the procedure of Example III except that the graft terpolymer is replaced by the same amount of the hydroxyl-containing polybutadiene used as a reactant in Example I, Part A. Physical test results are reported in Table III, Run 2.

TABLE III

|  | Run | |
|---|---|---|
|  | 1 | 2 |
| Tensile strength, psi | 3264 | 2689 |
| Elongation, % | 310 | 443 |
| Tear strength, pli | 430 | 345 |

Table III shows that the Example III polyurethane elastomer (Run 1) has significantly better tensile and tear strengths than the Example IV elastomer (Run 2).

EXAMPLE V

A graft copolymer is prepared in accordance with the procedure of Example I, Part A except that the reaction formulation contains 600 gms of the hydroxyl-containing polybutadiene, 180 gms of methyl methacrylate, 500 gms of toluene and 1.8 gms of benzoyl peroxide. The resulting liquid graft copolymer contains 21% by weight methyl methacrylate and has a hydroxyl content of 0.59 meq/gm and a Brookfield viscosity at 30° C. of 300 poise.

Polyurethane elastomer physical test specimens are made by the following procedure. One hundred gms of the above liquid graft copolymer is charged into a 2 liter glass laboratory reactor and degassed and dried at 125° C. under vacuum for 25 minutes. The reactor contents are cooled to room temperature and 7.37 gms of 4,4'-diphenylmethane diisocyanate and 0.01% dibutyltin dilaurate are added. The resulting mixture has an NCO/OH ratio of 1.0. The mixture is stirred for 8 minutes and poured into molds. Physical test specimens are prepared in accordance with the procedure of Example I, Part B. Physical test results are reported in Table IV, Run 1.

EXAMPLE VI

Physical test specimens are prepared in accordance with the procedure of Example V except that the graft copolymer is replaced by the same amount of the hydroxyl-containing polybutadiene used as a reactant in Example I, Part A. Physical test results are reported in Table IV, Run 2.

TABLE IV

|  | Run | |
|---|---|---|
|  | 1 | 2 |
| Tensile strength, psi | 945 | 140 |
| Elongation, % | 222 | 225 |
| Tear strength, pli | 88 | 38 |

Table IV shows that the Example V polyurethane elastomer (Run 1) has significantly better tensile and tear strengths than the Example VI elastomer (Run 2).

EXAMPLE VII

A graft copolymer is prepared in accordance with the procedure of Example I, Part A except that the reaction formulation contains 200 gms of hydroxyl-containing polybutadiene, 20 gms of styrene, 400 gms of benzene and 0.5 gm of benzoyl peroxide. The resulting graft copolymer contains 10% by weight styrene and has a hydroxyl content of 0.70 meq/gm. A polyurethane elastomer prepared from this graft copolymer will have better tensile and tear strengths than a polyurethane elastomer prepared from the ungrafted hydroxyl-containing polybutadiene but which is otherwise identical in formulation and preparation.

EXAMPLE VIII

Polyurethane elastomer is prepared in accordance with the procedure of Example I except that the benzene is omitted from the Part A reaction formulation. The polyurethane elastomer will have better tensile and tear strengths than a polyurethane elastomer which is prepared from ungrafted hydroxyl-containing polybutadiene but is otherwise identical in formulation and preparation.

Examples I, III, V, VII and VIII illustrate the preparation of polyurethane elastomers by the process of the invention. A comparison of the physical test results of the polymers prepared in Examples I, III and V with the physical test results of the corresponding conventionally prepared polyurethane elastomers (Examples II, IV, and VI show the superiority of elastomers prepared in accordance with the process of the invention.

EXAMPLE IX

Fifty gms of the hydroxyl-containing polybutadiene used as a reactant in Example I, Part A are charged into a 2 liter glass laboratory reactor equipped with a heater and an agitator and degassed and dried at 125° C. under vacuum for 25 minutes. The contents are cooled to room temperature and 35.35 gms of 4,4'-diphenylmethane diisocyanate are added to the reactor. The mixture is stirred for 15 minutes at room temperature and then heated to and maintained at 40° C. under a vacuum for 25 minutes with constant stirring. The reactor is cooled. The resulting product is a polyurethane prepolymer containing 12% free isocyanate. To the prepolymer is added 24.47 gms of N,N-bis(2-hydroxypropyl)phenylamine, 5 gms of methyl methacrylate, 0.1 gm of benzoyl peroxide, and 0.015% by weight dibutyltin dilaurate. The amount of N,N-bis(2-hydroxypropyl)-phenylamine added provides an NCO/OH ratio of 1.0 and the amount of methyl methacrylate added provides a polymer containing 10% methyl methacrylate, based on the weight of hydroxyl-containing polybutadiene in the product. The mixture is stirred for 8 minutes and then poured into a 5"×10"×⅛" mold and cured for one hour at 120° C. under ten tons of pressure. The polyurethane sheet is demolded and postcured for 48 hours at 50° C. Physical tests are carried out on test specimens prepared from the polyurethane and the results are reported in Table V.

TABLE V

| Tensile strength, psi | 2065 |
|---|---|
| Elongation, % | 117 |
| Tear strength | 261 |

A comparison of the physical test results of this elastomer with those obtained on a polyurethane elastomer having the same composition but which is prepared according to the teachings of this invention (Table I, Run 3) show that the latter elastomer has considerably superior tensile and tear strengths.

Example IX shows that polyurethane elastomer prepared in accordance with the process of the invention has much better properties than polyurethane elastomer having the same composition but prepared by a different procedure.

Although the invention has been illustrated by particular reference to specific examples it is intended that the scope of the invention be only limited to the breadth of the appended claims.

I claim:

1. A process of preparing polyurethane elastomers having improved physical properties comprising graft copolymerizing an ethylenically unsaturated monomer selected from the group consisting of styrene, esters of acrylic or methacrylic acid in which the alcohol portion of the ester contains 1 to 18 carbon atoms, vinyl esters and mixtures of these onto a liquid hydroxyl-containing butadiene polymer having a number average molecular weight of about 400 to 25,000 and 1.8 to 3 hydroxyl groups per molecule and reacting the resulting graft copolymer with a polyfunctional isocyanate at an isocyanate to total reactive hydrogen group ratio of about 0.8:1 to 1.5:1.

2. The process of claim 1 wherein said butadiene polymer is butadiene homopolymer.

3. The process of claim 1 wherein said butadiene polymer is a copolymer of butadiene.

4. The process of claim 3 wherein said butadiene copolymer is butadiene-styrene copolymer.

5. The process of claim 1 wherein said polyfunctional isocyanate is a diisocyanate.

6. The process of claim 5 wherein said diisocyanate is an aromatic diisocyanate.

7. The process of claim 1 wherein the graft polymerization step is carried out with the aid of a free radical catalyst and the reaction between the hydroxyl-containing graft copolymer is carried out in the presence of a urethane condensation catalyst.

8. The process of claim 1 wherein said hydroxyl-containing butadiene polymer has a number average molecular weight of about 900 to 10,000.

9. A process of preparing polyurethane elastomers having improved physical properties comprising
   (a) graft copolymerizing a ethylenically unsaturated monomer selected from the group consisting of styrene, methyl methacrylate, and mixtures of these onto a polyhydroxyl polymer containing an average of 1.8 to 2.8 hydroxyl groups per molecule, said polyhydroxyl polymer being an addition polymer of 0–75% by weight of an alpha monoolefinically unsaturated monomer of 2–12 carbon atoms and 25–100% by weight of 1,3-butadiene having a number average molecular weight of about 400–25,000, and
   (b) reacting the product of (a) with an aromatic diisocyanate with the aid of a urethane condensation catalyst at an isocyanate group to total reactive hydrogen group ratio of about 0.8:1 to 1.5:1.

* * * * *